US012766619B2

(12) United States Patent
Brumm et al.

(10) Patent No.: US 12,766,619 B2
(45) Date of Patent: Oct. 20, 2026

(54) DEVICE AND METHOD FOR MACHINING A WORKPIECE, AND COMPUTER PROGRAM PRODUCT FOR CONTROLLING A DEVICE FOR MACHINING A WORKPIECE

(71) Applicant: PITTLER T&S GMBH, Dietzenbach (DE)

(72) Inventors: Markus Brumm, Frechen (DE); Adam Gacka, Mühltal (DE); Maximilian Lux, Rodgau (DE); Martin Pöschel, Frankfurt am Main (DE)

( * ) Notice: Subject to any disclaimer, the term of this patent is extended or adjusted under 35 U.S.C. 154(b) by 469 days.

(21) Appl. No.: 18/278,912

(22) PCT Filed: Feb. 25, 2022

(86) PCT No.: PCT/EP2022/054818
§ 371 (c)(1),
(2) Date: Aug. 25, 2023

(87) PCT Pub. No.: WO2022/180223
PCT Pub. Date: Sep. 1, 2022

(65) Prior Publication Data

US 2024/0051046 A1 Feb. 15, 2024

(30) Foreign Application Priority Data

Feb. 26, 2021 (EP) .................................... 21159594

(51) Int. Cl.
*B23F 5/16* (2006.01)
*B23Q 39/02* (2006.01)

(52) U.S. Cl.
CPC ............. *B23F 5/163* (2013.01); *B23F 5/166* (2013.01); *B23Q 39/026* (2013.01)

(58) Field of Classification Search
CPC ........ B23F 5/163; B23F 5/166; B23Q 39/026; B23Q 39/025; B23Q 39/021; B23Q 2039/002; B23Q 39/02
See application file for complete search history.

(56) References Cited

U.S. PATENT DOCUMENTS

2011/0232092 A1 9/2011 Mueller et al.
2013/0094917 A1 4/2013 Koch et al.
(Continued)

FOREIGN PATENT DOCUMENTS

DE 298 15 125 U1 11/1998
DE 10 2014 218 082 B4 10/2016
(Continued)

OTHER PUBLICATIONS

The International Bureau of WIPO, International Preliminary Report On Patentability and Written Opinion of the International Searching Authority PCT/EP2022/054818—English Translation, Aug. 29, 2023 (Aug. 29, 2023), 16 pages, The International Bureau of WIPO, Geneva, Switzerland (CH).
(Continued)

*Primary Examiner* — Alan Snyder
(74) *Attorney, Agent, or Firm* — NK Patent Law

(57) ABSTRACT

A device, a method and a computer program product for machining a workpiece, in particular for cutting teeth into a workpiece, includes a base, a workpiece spindle mounted rotatably about a first axis (A) for receiving the workpiece, a first machining head having a first tool spindle mounted rotatably relative to a first tool axis for receiving a first machining tool, and a second machining head having a second tool spindle mounted rotatably relative to a second tool axis for receiving a second machining tool. At least the first machining head is provided with the first machining tool for power skiving the workpiece and at least the second machining head is variably positionable and/or variably
(Continued)

orientable relative to the first machining head and independently of the first machining head.

13 Claims, 5 Drawing Sheets

(56) References Cited

U.S. PATENT DOCUMENTS

| | | | |
|---|---|---|---|
| 2014/0050546 | A1 | 2/2014 | Prock et al. |
| 2017/0173713 | A1 | 6/2017 | Thijssen et al. |
| 2018/0236576 | A1 | 8/2018 | Tachikawa et al. |

FOREIGN PATENT DOCUMENTS

| | | | |
|---|---|---|---|
| DE | 10 2018 103 600 | A1 | 8/2018 |
| DE | 10 2018 003 935 | A1 | 11/2019 |
| EP | 1 270 145 | A2 | 1/2003 |
| EP | 2 308 626 | A1 | 4/2011 |
| EP | 2 766 142 | A1 | 8/2014 |
| EP | 4 269 010 | A1 | 11/2023 |
| WO | 2010075600 | A1 | 7/2010 |
| WO | 2010079113 | A2 | 7/2010 |
| WO | 2013055768 | A1 | 4/2013 |

OTHER PUBLICATIONS

European Patent Office, International Search Report PCT/EP2022/054818 and Written Opinion, May 9, 2022 (May 9, 2022), 18 pages, European Patent Office, Rijswijk, Netherlands (NL).

DEVICE AND METHOD FOR MACHINING A WORKPIECE, AND COMPUTER PROGRAM PRODUCT FOR CONTROLLING A DEVICE FOR MACHINING A WORKPIECE

CROSS-REFERENCE TO RELATED APPLICATIONS

This United States non-provisional application is the national stage of International Application No. PCT/EP2022/054818 filed on Feb. 25, 2022, which claims the benefit of priority to European Application No. EP 21 159 594.7 filed on Feb. 26, 2021, the entire disclosures of which are incorporated herein by reference.

FIELD OF THE INVENTION

The present invention relates to a device, a method and a computer program product for machining a workpiece, in particular gear-cutting of a workpiece, such as for multiple simultaneous gear-cutting of a workpiece.

BACKGROUND OF THE INVENTION

For the production and machining of gear wheels, so-called power skiving is widely known in the prior art. Here, a toothed workpiece, or one into which teeth must be cut, with a workpiece spindle is rotated about a workpiece axis. A skiving tool or cylindrical milling cutter is then turned at a predefined angle relative to the rotational axis of the workpiece and comes into material-removal engagement with the workpiece.

During skiving, a coupled movement of the skiving tool relative to the movement of the workpiece is carried out. The rotational axis of the tool and the rotational axis of the workpiece are here oriented relative to one another at the so-called axis intersection angle. The rotational axis of the tool in particular runs obliquely to the rotational axis of the workpiece.

Skiving combines milling and gear-shaping by continuous rolling of the tool with an axial advance relative to the workpiece. The crossed or skewed arrangement of the tool and workpiece axes leads to a relative speed between the rotating tool and the rotating workpiece. This relative movement is utilized as the cutting movement and its main cutting direction is along the tooth gap of the workpiece. The cutting speed depends on the size of the axis intersection angle and the rotation speed of the tool or workpiece.

If for example a workpiece is to be provided with multiple, possibly different toothings, this typically requires at least two successive gear-cutting steps, in particular if the two toothings are different. Typically, it is provided to produce the two toothings in or on the workpiece successively. Using a first tool for example, a first toothing can be cut in the workpiece. After retooling a gear-cutting machine, then in a following step a second toothing can be cut in the same workpiece. If the workpiece is to be machined using one and the same gear-cutting machine, retooling is required, e.g. a tool change of the corresponding gear-cutting machine.

To produce multiple or different toothings of a workpiece, it is furthermore conceivable, in order to cut two toothings on one and the same workpiece, to provide at least two gear-cutting machines, each of which is equipped with a tool provided for the respective toothing. A first toothing of the workpiece can then be produced with a first gear-cutting machine. The workpiece may then be transferred from the first gear-cutting machine to the second gear-cutting machine. The second gear-cutting machine is then used to produce the second toothing.

In brief, to produce multiple toothings by material removal on one and the same workpiece, it is necessary either to retool a gear-cutting machine or to machine the workpiece concerned using different gear-cutting machines. This is necessarily associated with retooling the gear-cutting machine and/or unclamping and re-clamping the workpiece on one or more gear-cutting machines. If it is required for the workpiece that a first toothing and a second toothing stand at a fixed e.g. predefined relationship to one another, this is difficult to achieve using the methods and devices presently available because of the described retooling of the gear-cutting machine or repositioning of the workpiece, or can only be achieved with comparatively great complexity (e.g. by measuring the tooth position) during retooling or re-clamping.

OBJECT AND SUMMARY OF THE INVENTION

It is thus the object of the present invention to provide a device for cutting teeth into a workpiece and a corresponding method by which toothed workpieces, in particular workpieces with multiple toothings, can be produced with minimum machining time, in high quality and with a high degree of precision. It is a particular object to provide a process suitable for mass production and a corresponding device in which the cycle times for producing multiple toothings can be shortened in comparison with known solutions.

This object is achieved with a device, a method and a computer program according to the features of the present invention. Exemplary embodiments of the present invention are disclosed herein.

In a first aspect, a device is provided for machining, in particular gear-cutting, of a workpiece. The device comprises a base and a workpiece spindle mounted rotatably about a first axis (A) for receiving the workpiece. By means of the workpiece spindle, the workpiece is mounted on the base rotatably about the first axis (A).

The device furthermore comprises a first machining head with a first tool spindle mounted rotatably relative to a first tool axis. The first machining head or its first tool spindle is configured and provided for receiving a first machining tool. The first machining tool can be mounted on the machining head by means of the first tool spindle so as to be rotatable relative to the first tool axis. The first machining tool to be mounted on the tool spindle can be mounted on the machining head so as to be rotatable relative to the first tool axis.

The device furthermore comprises a second machining head for receiving a second machining tool.

At least the first machining head, which can be equipped with the first machining tool, is configured for power skiving of the workpiece, in particular for cutting teeth into the workpiece by skiving, i.e. for gear-cutting of the workpiece by means of skiving. The machining tool is typically a power skiving tool, for example a skiving wheel.

The second machining head is variably positionable and/or variably orientable relative to the first machining head and independently of the first machining head. In other words, the position and/or orientation of the second machining head can be changed variably relative to the first machining head.

The variable positionability and/or orientability of the second machining head relative to the first machining head may be steplessly variable. It is furthermore conceivable that the second machining head is variably orientable or positionable with respect to its position and/or orientation not only relative to the first machining head but also relative to the base. Typically, it is provided that both the first machining head and the second machining head are variably positionable and/or variably orientable relative to the base. In particular, each of the two machining heads can be variably positioned and/or variably oriented independently of the respective other machining head.

As a result, during power skiving using the first machining tool, in particular the second machining tool can be used by means of the second machining head for various other machining steps for machining the workpiece. The variable positionability and/or orientability of the first and/or second machining head may in particular allow a simultaneous or synchronized machining of the workpiece with the first machining tool mounted on the first machining head, and also with the second machining tool which is arranged on the second machining head.

Thanks to the variable positionability and/or variable orientability of the second machining head relative to the first machining head and/or relative to the base, the second machining head or its second machining tool can be used extremely flexibly for machining the workpiece, e.g. for gear-cutting, deburring or milling, while the first machining tool stands in machining engagement with the workpiece. The second machining tool may also be used for power skiving of the workpiece and to this extent may be in skiving engagement with the workpiece simultaneously or at least temporally overlapping with the first machining tool.

In this way, a particularly efficient machining of the workpiece can be achieved. Cycle times or cycle lengths can be shortened accordingly. Also, by simultaneous machining of the workpiece with the first and second machining tools, the precision of production of the workpiece can be increased. The first and second machining processes, which take place simultaneously or at least partly temporally overlapping and can be carried out with the first and second machining tools, require neither retooling of the device nor re-clamping of the workpiece.

According to a further embodiment, the second machining head is freely positionable and/or freely orientable relative to the first machining head. Similarly, the second machining head and also the first machining head may be configured, or mounted or movably implemented, so as to be freely positionable and/or freely orientable relative to the base. Free positionability and/or free orientability here means an orientation or positioning with respect to all spatial axes and rotational axes in space.

The first and second machining heads may here be arranged movably on the base. The base may provide a common base for both the workpiece spindle and for the first and second machining heads. The arrangement of the workpiece spindle and the first and second machining heads on the base allows a particularly compact and space-saving construction of the device provided here for machining a workpiece.

Thus the second machining head may typically be moved or pivoted or turned relative to the first machining head and/or relative to the base with three degrees of movement freedom and three degrees of rotational freedom. Furthermore, a stepless free positionability and/or stepless free orientability may be provided for the second machining head relative to the first machining head, but also correspondingly for the first machining head relative to the second machining head, and also for both machining heads relative to the base. This provides a maximum flexibility in use of the device and for implementation of a corresponding method for machining or gear-cutting of a workpiece.

Because the first and second machining heads are freely positionable and/or freely orientable relative to one another, and because of the positionability and/or orientability of each machining head independently of the other machining head, by means of the machining heads and the machining tools provided thereon, mutually independent machining processes can be carried out simultaneously on the workpiece.

According to a further embodiment, the first machining head and the second machining head are arranged on the base so as to be displaceable relative to a first direction (x) independently of one another. For the displaceable arrangement of the machining heads, a dedicated slide guide may be provided on each of the machining heads. This may be a stepless slide guide which typically is coupled to a drive, preferably a first electric drive. By activation or control of the first electric drive, the machining head concerned can be displaced or moved in the first direction (x) relative to the base. It is in particular provided that the first machining head and the second machining head are each provided with a first dedicated drive, so that by corresponding activation or control of the drives of the first and second machining heads, corresponding displacement movements can be implemented relative to one another and also relative to the base.

According to a further embodiment, the first machining head and the second machining head are arranged on the base so as to be displaceable relative to a second direction (y) independently of one another. Here again, for the displaceable arrangement of the machining heads, a dedicated slide guide may be provided on each of the machining heads. This may be a stepless slide guide which typically is coupled to a drive, preferably a second electric drive. By activation or control of the second electric drive, the machining head concerned can be displaced or moved in the second direction (y) relative to the base. It is in particular provided that the first machining head and the second machining head are each provided with a second dedicated drive, so that by corresponding activation or control of the drives of the first and second machining heads, corresponding displacement movements can be implemented relative to one another and also relative to the base.

According to a further embodiment, the first machining head and the second machining head are arranged on the base so as to be displaceable relative to a third direction (z) independently of one another. Here again, for the displaceable arrangement of the machining heads, a dedicated slide guide may be provided on each of the machining heads. This may be a stepless slide guide which typically is coupled to a drive, preferably a third electric drive. By activation or control of the third electric drive, the machining head concerned can be displaced or moved in the third direction (z) relative to the base. It is in particular provided that the first machining head and the second machining head are each provided with a third dedicated drive, so that by corresponding activation or control of the drives of the first and second machining heads, corresponding displacement movements can be implemented relative to one another and also relative to the base.

According to a further embodiment, the first machining head is mounted pivotably with respect to a first pivot axis running substantially perpendicularly to the first tool axis. The first machining head may in particular be mounted pivotably with respect to the base. It is furthermore conceivable that the first machining head is arranged on a first carrier mounted movably on the base. The pivot axis may be formed stationarily on the carrier so that the first machining head is mounted on the first carrier so as to be pivotable with respect to the first pivot axis. The pivotable mounting of the first machining head with respect to the first pivot axis, paired with the displaceable movability of the first machining head in the first direction (x), the second direction (y) and/or the third direction (z), allows the setting of any required orientation of machining tool or tool axis.

According to a further embodiment, the second machining head is mounted pivotably with respect to a second pivot axis running substantially perpendicularly to the second tool axis. The second machining head may in particular be mounted pivotably with respect to the base. It is furthermore conceivable that the second machining head is arranged on a second carrier mounted movably on the base. The pivot axis may be formed stationarily on the carrier so that the second machining head is mounted on the second carrier so as to be pivotable with respect to the second pivot axis. The pivotable mounting of the second machining head with respect to the second pivot axis, paired with the displaceable movability of the second machining head in the first direction (x), the second direction (y) and/or the third direction (z), allows the setting of any required orientation of machining tool or tool axis.

According to a further embodiment, the first machining head with the first machining tool can be brought into engagement with a first portion of the workpiece. The second machining head with the second machining tool can be brought into simultaneous or at least temporally overlapping engagement with a second portion of the workpiece. The first portion and the second portion of the workpiece are offset to one another axially and/or radially relative to the first axis. In other words, the first and second machining tools of the first and second machining heads are in engagement with different portions of the workpiece simultaneously but without a physical overlap. In this way however, physically separate portions or sections of the workpiece can be machined simultaneously with the first machining tool and the second machining tool.

According to a further embodiment, the second machining head has a second tool spindle mounted rotatably relative to a second tool axis for receiving the second machining tool. The second machining head may be configured substantially identically or symmetrically to the first machining head. To this extent, it is conceivable that the first machining head and the second machining head, with the first and second machining tools mounted rotatably thereon, are configured for simultaneous power skiving of one and the same workpiece. In particular, the first and second machining heads may be configured for simultaneous or temporally overlapping gear-cutting by skiving of one and the same workpiece.

According to a further embodiment of the device, the second machining head, which can be equipped with the second machining tool, is configured for power skiving of the workpiece, in particular for gear-cutting by skiving of the workpiece.

To this extent, the machining head equipped with the first machining tool for implementing a first skiving process may machine the first portion of the workpiece while—simultaneously or temporally overlapping—the second machining tool using the second machining head performs a second machining of the second portion of the workpiece.

The first machining process, which can be performed by the first machining head, and the second machining process, which can be performed by the second machining head simultaneously or temporally overlapping, may each be a skiving process or a power skiving of the workpiece.

To this extent, according to a further embodiment, it may be provided that the first machining head and the second machining head are configured for simultaneous power skiving of the workpiece, in particular for simultaneous or temporally overlapping and in some cases multiple gear-cutting by means of skiving. The simultaneous or at least temporally overlapping power skiving of the workpiece relates here to physically non-overlapping or overlap-free first and second portions of the workpiece, which are typically spaced from one another axially and/or radially. It is however also conceivable that by means of the first and second machining heads, at different regions, e.g. spaced apart from one another in the circumferential direction, one and the same toothing of the workpiece can be or is produced or machined simultaneously or temporally overlapping.

The first and second portions of the workpiece may belong to one and the same toothing or also to different toothings. The device, in particular its two machining heads and the machining tools provided thereon, may to this extent be provided for simultaneous or temporally overlapping machining or gear-cutting of one and the same toothed portions or portions to be toothed of the workpiece, and used accordingly. Similarly, here also different, physically non-overlapping, toothed portions or portions to be toothed, or two different or mutually separate toothings or workpiece portions to be toothed, can be machined simultaneously.

Thus, relative to the rotational axis of the workpiece spindle, the two machining heads may be in simultaneous or temporally overlapping engagement with different first and second portions of the workpiece which are arranged on the workpiece offset to one another radially, axially and/or in the circumferential direction with respect to the first axis.

The machining heads and the machining tools provided thereon may here be in simultaneous engagement with one and the same already toothed portion or portion of the workpiece to be toothed, or with different toothed portions of the workpiece or portions to be toothed which may be axially spaced from one another.

According to a further embodiment of the device, the first machining head, which can be or is equipped with the first machining tool, and/or the second machining head, which can be or is equipped with the second machining tool, are configured for producing and/or machining a first and/or a second toothing of the workpiece.

The first and second machining heads may here be configured for producing a first toothing of the workpiece simultaneously or with a temporal overlap, and be actuated accordingly. Similarly, and thereafter, the first and second machining heads may also be configured for producing a second toothing of the workpiece simultaneously or with a temporal overlap, and actuated accordingly. The second toothing is here typically formed or configured axially offset or axially spaced from the first toothing. The first and second toothings may however also be configured physically overlapping on the workpiece.

The first and second machining heads may be in engagement with the workpiece temporally overlapping or simultaneously, such that both the first and the second machining heads produce a first toothing in the workpiece, e.g. by means of skiving. Then the first and second machining heads may produce a second toothing in the workpiece, e.g. by means of skiving. Here, the first and second machining heads, with their respective machining tools, may be in simultaneous or temporally overlapping engagement with one and the same toothing, or with one and the same portion of the workpiece to be toothed. The first and second machining heads may here be in engagement for example with regions of the workpiece which are spaced apart from one another in the circumferential direction and/or in the axial direction of the workpiece.

It is furthermore conceivable that the first machining head is or can be brought into engagement with a first portion of the workpiece for forming a first toothing of the workpiece, and the second machining head is or can be brought into simultaneously or temporally overlapping engagement with a second portion of the workpiece for forming a second toothing of the workpiece. The second portion of the workpiece or the second toothing may be offset or spaced from the first portion or first toothing in the axial direction, in the circumferential direction and/or in the radial direction. For gear-cutting of the workpiece, e.g. for forming a first toothing and for forming a second toothing, the machining tools provided or rotatably mounted on the first and second machining heads may each be brought into or stand in skiving engagement with the workpiece.

According to a further embodiment, the device has a controller for controlling the first machining head and second machining head. By means of the controller, in particular a program-controlled positioning and/or orientation of the first and/or second machining heads can be achieved. With simultaneous or temporally overlapping performance of power skiving processes by the first and second machining heads on one and the same workpiece which is mounted rotatably on the workpiece spindle, the first and second machining processes, which can be carried out by the first and second machining heads respectively, are matched to one another or coupled together taking into account the respective machining process. The power skiving processes may comprise cutting or peeling of a toothing.

According to a further embodiment of the device, the controller is configured for simultaneous control of the first and second machining heads such that with respect to the workpiece machining, the following correlation applies:

$$n_c = n_b * \left(\frac{z_b}{z_2}\right) + v_{z2} * \left(\frac{u_{dz2}}{z_2}\right) = n_a * \left(\frac{z_a}{z_1}\right) + v_{z1} * \left(\frac{u_{dz1}}{z_1}\right), \text{ where:}$$

$n_c$: rotation speed of workpiece axis $n_a$: rotation speed of $1st$ tool spindle $n_b$: rotation speed of $2nd$ tool spindle $z_a$: tooth count of $1st$ skiving tool $z_b$: tooth count of $2nd$ skiving tool $z_1$: tooth count of $1st$ toothing of workpiece $z_2$: tooth count of $2nd$ toothing of workpiece $v_{z1}$: advance speed of axial axis ($z$) of $1st$ tool spindle $v_{z2}$: advance speed of axial axis ($z$) of $2nd$ tool spindle $$u_{dzi} = \text{axial} - \text{differential} - \text{constant} = \sin\left(\frac{\beta_i}{m_{ni} * \pi}\right); \text{ where } i = 1, 2$$

wherein i=1 indicates the first skiving tool or first toothing of workpiece and i=2 the second skiving tool or second toothing of workpiece, and wherein:

$\beta_i$: slope angle of teeth of workpiece i $m_{ni}$: normal modulus of toothing i.

The slope angle is the tilt or slope of the teeth of the respective toothing relative to the workpiece axis or the rotational axis. It is therefore a characteristic value for helical gearing. The normal modulus of the toothing is the quotient of the pitch circle diameter d and the tooth count z of the respective toothing.

The first and second machining heads, in particular also the first and second tool spindles each equipped with a machining tool, are actuated by the controller in compliance with the above-mentioned correlation. In this way, it can be achieved that two skiving processes can be performed on one and the same workpiece simultaneously or at least with a temporal overlap. The dynamic control parameters of a machining head must be adapted to the dynamic control parameters of the first machining head, or are adapted thereto by means of the controller, wherein the type of toothing to be produced or machined by the first machining head and the second machining head, and the type and configuration of the respective machining tools, must be taken into account.

The dynamic control parameters here are in particular the rotation speed of the machining tools or respective tool spindles at the respective machining head, the advance speed of the machining tools in the axial direction relative to the respective tool axis, and the advance speed of the machining tool tangentially thereto.

Furthermore, the rotation speed of the tool spindle or rotation speed of the workpiece must be taken into account. The dynamic and simultaneous actuation of first and second machining heads in compliance with the above-mentioned correlation allows a first toothing to be produced in a first region of the workpiece and, simultaneously or temporally overlapping therewith, the same first or a second toothing to be produced in a second region of the workpiece. Production of the first and second toothings may take place in parallel or simultaneously or at least temporally overlapping. This leads to a reduction in machining time and cycle time.

Because multiple portions of the same toothing or different toothings can be produced simultaneously or temporally overlapping by means of a device, an increased level of precision can be achieved for the gear-cutting. Thus, for the relative position and/or relative configuration or tooth position of the first toothing relative to the second toothing, an increased level of precision can be achieved. For the production of the first and second toothing, it is no longer necessary to retool a corresponding gear-cutting machine and/or unclamp the workpiece from a first workpiece spindle of a first gear-cutting device and clamp it into a second workpiece spindle of the second gear-cutting device. All retooling or clamping processes are always associated with component tolerances since retooling the gear-cutting machine and/or re-clamping the workpiece are in practice associated with comparatively high tolerances.

Such geometric deviations can be largely eliminated by means of the device proposed here and the method which can be performed therewith. Thus, in particular a relative phase or position and/or orientation of the first toothing relative to the second toothing can be matched precisely to one another, not least since the first machining tool and second machining tool, with the first and second machining heads, stand in a fixed, system-wide known positional relationship to one another, which can be controlled or set by the controller.

In principle, for the machining or gear-cutting device, the first machining head and second machining head must be variably positionable and/or variably orientable relative to one another. Furthermore, at least the first machining head must be configured for power skiving of the workpiece. This means that at least the first machining head is positionable and/or orientable relative to the workpiece spindle such that a required power skiving process can be performed.

With respective to a free positionability and orientability of the machining heads and workpiece spindle, widely varying configurations are possible.

Thus, it is for example conceivable that the axis of the workpiece spindle is arranged stationarily on the base of the device. Then the first machining head is variably positionable and/or variably orientable relative to the workpiece spindle. Similarly, the second machining head is variably positionable and/or variably orientable relative to the workpiece spindle and relative to the first machining head.

In other embodiments, it is for example also conceivable that one of the machining heads is arranged stationarily or restricted with respect to one or more movement degrees of freedom in favor of the movability and orientability of the workpiece spindle. For example, it is conceivable that the first machining head is fixed stationarily on the base and, instead, the workpiece spindle is variably positionable and/or variably orientable relative to the first machining head.

The restriction of a movement degree of freedom of one of the machining heads may be associated with a corresponding increase in the corresponding movement degree of freedom of the tool spindle or the other machining head.

In order to implement the device according to the invention, it is merely decisive that the first machining head is variably positionable and/or variably orientable relative to the workpiece spindle, such that a power skiving of the workpiece mounted rotatably on the workpiece spindle can be carried out using the first machining head and first machining tool provided thereon. Furthermore, the second machining head must be variably positionable and/or variably orientable relative to the first machining head and independently of the first machining head.

According to a further aspect, the present invention furthermore concerns a method for machining, in particular gear-cutting of a workpiece. The method comprises the steps of arranging a workpiece to be machined, in particular by gear-cutting, on a workpiece spindle mounted rotatably about a first axis of a device for workpiece machining. In a further step, it is provided that at least a first portion of the workpiece is machined by skiving, e.g. gear-cut by skiving, by means of a first machining tool which is arranged on a first tool spindle of a first machining head of the device for cutting teeth into a workpiece. Thus, a first power skiving process takes place on the workpiece, which can be carried out by means of the first machining tool or by the first machining head of the device.

Simultaneously or temporally overlapping therewith, a second portion of the workpiece is machined by means of a second machining tool. The second machining tool is here arranged on a second machining head of the same device, wherein the second machining head is variably positioned and/or variably oriented relative to the first machining head and independently of the first machining head. The variable positioning and/or variable orientation of the second machining head and second machining tool takes place during the power skiving of the workpiece by means of the first machining tool, or by means of the second machining head. During simultaneous machining of the first and second portions of one and the same workpiece by means of first and second machining tools, the latter are typically moved, displaced and/or pivoted relative to the workpiece and/or relative to one another by means of the above-mentioned controller depending on the machining process.

According to a further embodiment, the gear-cutting method can be carried out and implemented with an above-described gear-cutting device. To this extent, all features, advantages and effects described for the above-mentioned device also apply accordingly to the method for cutting teeth into the workpiece, and vice versa.

According to a further embodiment of the method, the second portion of the workpiece is machined by power skiving, in particular gear-cutting by skiving, by means of the second machining tool which is arranged on a second tool spindle of the second machining head. To this extent, a simultaneous but at least temporally partially overlapping power skiving or gear-cutting of the first and second portions of the workpiece can take place.

According to a further method, it is provided that the first portion and the second portion of the workpiece are offset to one another axially and/or radially relative to the first axis. The axial offset here relates to the first axis, with respect to which the workpiece spindle is rotatably mounted on the base. Also, toothings arranged axially offset to one another or axially adjoining one another can be machined simultaneously in the workpiece. It is furthermore possible that the first portion of the workpiece is or comprises an internal toothing and that the second portion of the workpiece is or comprises an external toothing.

It is here furthermore conceivable that the two machining tools simultaneously produce or machine two different or mutually adjacent external toothings in or on the workpiece. Furthermore, the two machining tools may each machine an internal toothing in the workpiece simultaneously or temporally offset to one another, or the first and second machining heads and their machining tools may simultaneously produce or machine an internal and an external toothing in the workpiece.

According to a further embodiment of the method, the first machining head, the first tool spindle, the second machining head, the second tool spindle and the workpiece spindle are actuated simultaneously by means of a controller such that the following correlation applies:

$$n_c = n_b * \left(\frac{z_b}{z_2}\right) + v_{z2} * \left(\frac{u_{dz2}}{z_2}\right) = n_a * \left(\frac{z_a}{z_1}\right) + v_{z1} * \left(\frac{u_{dz1}}{z_1}\right)$$

According to a further aspect, the present invention furthermore concerns a computer program product for controlling a device for machining or gear-cutting of a workpiece, wherein the device preferably comprises a base and a workpiece spindle mounted rotatably about a first axis (A) for receiving the workpiece, and a first machining head and a second machining head. The first machining head has a first tool spindle mounted rotatably about a first tool axis for receiving a first machining tool. The second machining head is configured for receiving a second machining tool, typically by means of a second tool spindle mounted rotatably relative to a second rotational axis.

Typically, the computer program is configured for controlling an above-described device for machining or gear-cutting of a workpiece, or for performing the above-described method for machining or gear-cutting of a workpiece.

The computer program product comprises commands which, when the program is executed on a computer or a controller of the device for machining or gear-cutting of workpieces, cause the computer or controller concerned to bring the first machining head with machining tool arranged thereon into skiving engagement with a first portion of the workpiece and thus carry out a first skiving process.

The computer program product comprises further commands which, when the program is executed on a computer or a controller, cause the latter to machine a second portion of the workpiece by means of a second machining tool simultaneously or temporally overlapping with the first skiving process, wherein the second machining head or the second machining tool is variably positioned and/or variably and/or freely oriented relative to the first machining head and independently of the first machining head.

It is in particular provided in another embodiment that the computer program product comprises programming means which, when the program is executed on the computer or controller, causes the machining or gear-cutting device to carry out a first power skiving of at least a first portion of the workpiece by means of the first machining tool, and temporally overlapping or simultaneously therewith, to carry out a second power skiving of at least a second portion of the workpiece by means of the second machining tool. The simultaneous or temporally overlapping performance of the first and second power skiving steps requires individual control of the first and second machining heads, in particular independently of one another, or according to predefined peripheral conditions.

Thus, according to another embodiment, in particular it is provided that the computer program product comprises programming means which, when executed on the computer or controller of the device for gear-cutting, causes the latter to control the rotation speed of the workpiece axis, the rotation speed of the first tool spindle, the rotation speed of the second tool spindle and the movements of the machining heads, such that the following correlation applies:

$$n_c = n_b * \left(\frac{z_b}{z_2}\right) + v_{z2} * \left(\frac{u_{dz2}}{z_2}\right) = n_a * \left(\frac{z_a}{z_1}\right) + v_{z1} * \left(\frac{u_{dz1}}{z_1}\right)$$

BRIEF DESCRIPTION OF THE DRAWING FIGURES

Further objectives, features and advantageous possible applications of the device and method are explained below in the following description of exemplary embodiments with reference to the accompanying drawing figures. In the drawings.

DETAILED DESCRIPTION OF EXEMPLARY EMBODIMENTS

Figure 1:
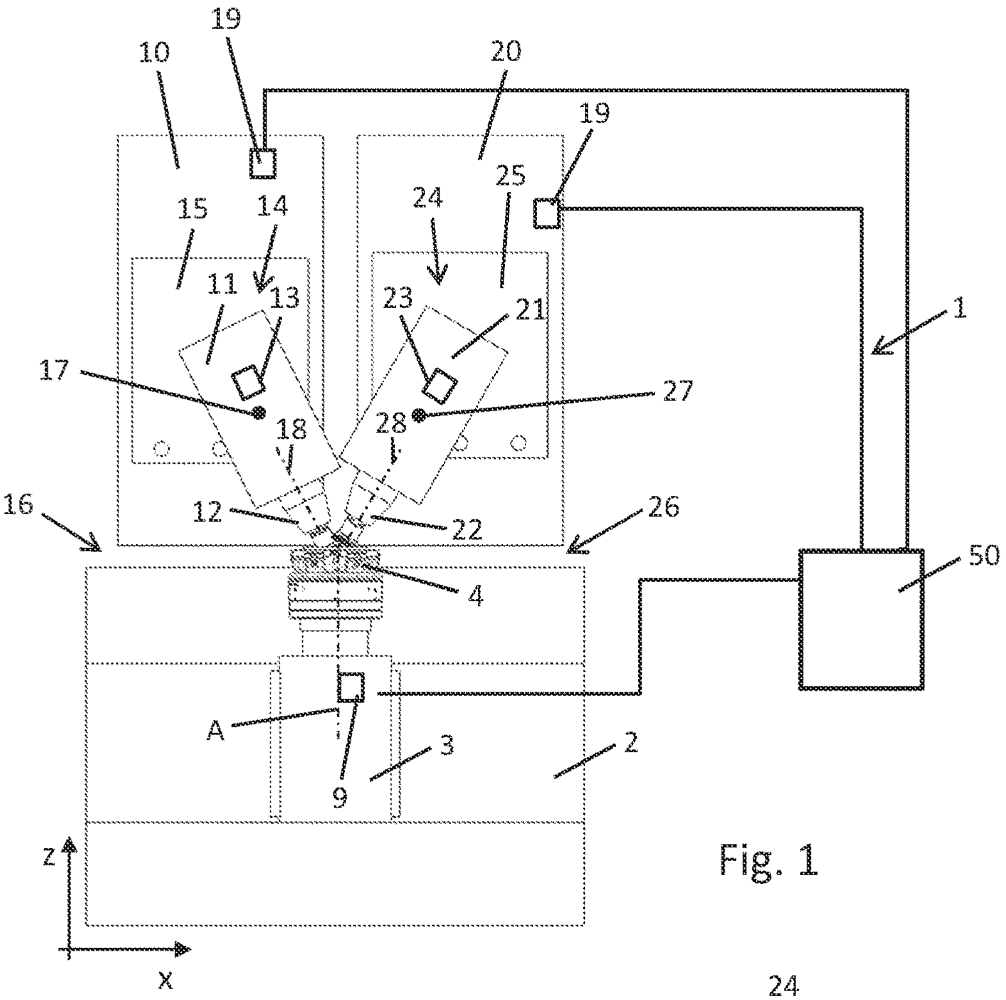
FIG. 1 shows a schematic view of an exemplary embodiment of a device for gear-cutting of a workpiece, viewed from the front.

FIG. 1 shows an exemplary embodiment of a device 1 according to the invention for cutting teeth in a workpiece. The device 1 is configured as a gear-cutting device. It has a base 2 and a workpiece carrier 3. The workpiece carrier 3 is arranged on the stationary base 2. A workpiece spindle 4 is arranged rotatably on the workpiece carrier 3. The workpiece spindle 4 is rotatable relative to a first axis (A), in particular can be driven in rotation by means of a drive. The first axis is accordingly also described as the workpiece axis (A). Typically, the workpiece spindle 4 is equipped with a corresponding spindle drive 9 in order to rotate the workpiece spindle 4 under control in regulatable fashion. The spindle drive 9 is to this extent typically signal-transmissively coupled to a controller 50. The workpiece 5 (see FIGS. 5 to 9) can be releasably attached, e.g. clamped, to the workpiece spindle 4. By means of the rotatable mounting of the workpiece spindle 4, the workpiece 5 can be turned relative to the first axis (A) for the purpose of workpiece machining.

The gear-cutting device 1 furthermore has a first machining head 11 and a second machining head 21. A first tool spindle 12 is mounted on the first machining head 11 so as to be rotatable with respect to a first tool axis 18. Similarly, a second tool spindle 22 is mounted on the second machining head 21 so as to be rotatable with respect to a second tool axis 28. The first and second tool spindles 12, 22 serve to receive corresponding first and second machining tools 30, 40, as shown in detail for example in FIGS. 5 to 9.

At least the first machining head 11 is configured for carrying out a power skiving of the workpiece 5. Accordingly, at least the first machining head 11 can be actuated by a controller 50 for performing a skiving process and moved relative to the workpiece 5.

Similarly, the second machining head 21 may also be configured for carrying out a power skiving process on one and the same workpiece 5. The second machining head 21 can also be controlled and actuated with respect to its position and/or orientation by the controller 50. It is here provided in particular that the first machining head 11 and the second machining head 21 are in principle freely positionable and/or freely orientable relative to one another. In particular, it is provided that the first machining head 11 and the second machining head 21 are variably positionable and/or variably orientable relative to one another. This is achieved by the mutually independent mounting and displacement of the respective machining heads 11, 21 on the base 2.

The mutually independent free positioning and/or free orientation of the two machining heads 11, 21, and also a mutually independent activation or control of drives for rotating the corresponding tool spindles 12, 22, serve in particular for simultaneous performance of two skiving processes on one and the same workpiece 5. In principle, the free positionability and/or free orientability, and also the mutually independent actuation of the tool spindles 12, 22, can be achieved in widely varying and different fashions.

In the present exemplary embodiment, the first machining head 11 is mounted displaceably on a first carrier 10 via a positioning device 14. The second machining head 21 is also mounted on a second carrier 20 via a corresponding positioning device 24. The first carrier 10 is mounted displaceably with respect to a second direction (y) relative to the base 2. Similarly, the second carrier 20 is mounted displaceably relative to the second direction (y) on the base 2.

The first carrier 10 is typically mounted on the base 2 in the second direction (y) via a corresponding positioning device 16. Similarly, the second carrier 20 is arranged displaceably in the second direction (y) on the base 2 via a further positioning device 26. The positioning devices 16, 26 may be configured as slide guides. Corresponding and mutually engaging guide rails may here be provided on the carriers 10, 20 and also on the base 2.

The positioning devices 16, 26 may in particular be provided with a drive, typically an electric drive, by means of which the carriers 10, 20 can be moved independently of one another relative to the base 2 along the second direction (y) by means of the controller 50. The controller 50 is in particular coupled to the electric drives in order to implement a correspondingly required displacement movement of the carriers 10, 20 relative to the base 2 and also relative to one another.

In the present case, the positioning devices 16, 26 are configured as one-dimensional slide guides, by means of which the carriers 10, 20 can be moved relative to the base 2 only in the second direction (y). In principle however, it is also conceivable that the positioning devices 16, 26 are configured as two-dimensional positioning devices, for example as compound slides.

The machining heads 11, 21 are similarly displaceably or movably mounted on the respective carriers 10, 20 by means of corresponding positioning devices 14, 24. The first machining head 11 is displaceably mounted by means of the positioning device 14 on the first carrier 10 so as to be longitudinally displaceable with respect to the first direction (x) and with respect to the third direction (z). Similarly, the positioning device 24 is configured as a two-dimensional positioning device. By means of the positioning device 24, the second machining head 21 is arranged on the carrier 20 displaceably with respect to the first direction (x) and with respect to the third direction (z).

The positioning devices 14, 24 each have a slide 15, 25, arranged for example on the carrier 10, 20. The slide 15, 25 may in particular be implemented or configured as a compound slide so that the first machining head 11 is mounted on the first carrier 10 by means of the slide 15 of the positioning device 14 so as to be movable or displaceable with respect to the first direction (x) and with respect to the third direction (z). Similarly, the second machining head 21 may be mounted on the second carrier 20 by means of the slide 25 of the positioning device 24 so as to be longitudinally displaceable in the first direction (x) and in the third direction (z).

The signaling connection between the central controller 50 and the positioning devices 14, 16, 24, 26 is not explicitly shown here. For reasons of clarity, the mutual engagement of guide rails of the slides 15, 25 with corresponding guide elements on the machining heads 11, 21 is not explicitly shown. The positioning devices 14, 16, 24, 26 are typically implemented with commercially available guide rails or motorized slide guides.

Figure 2:
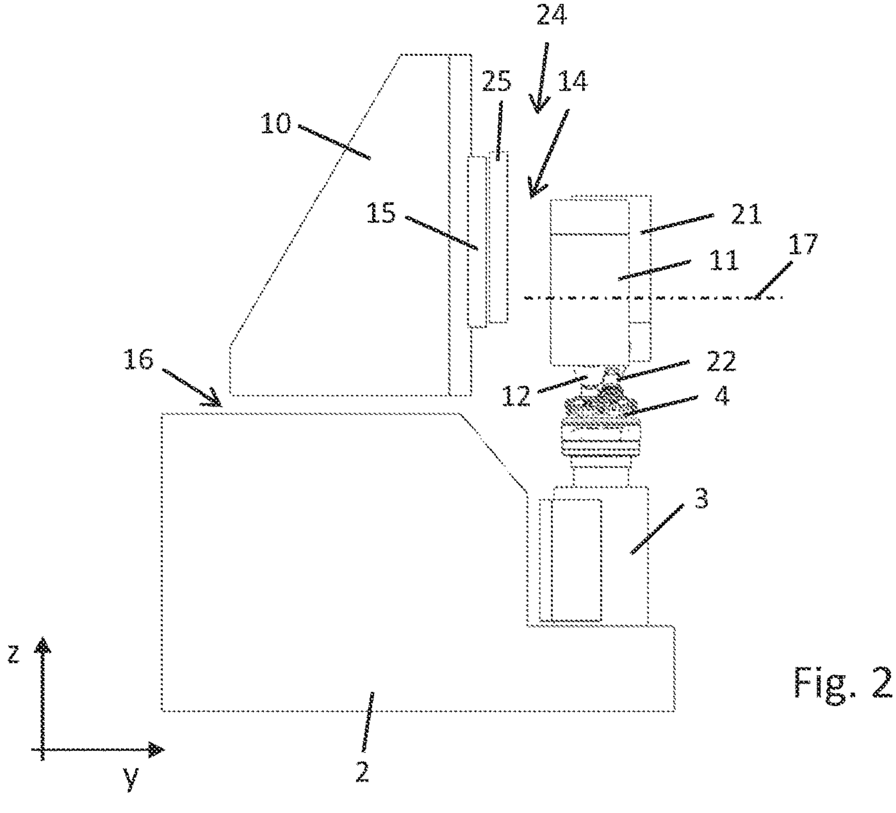
FIG. 2 shows a schematic illustration of the device, viewed from the side.
Figure 3:
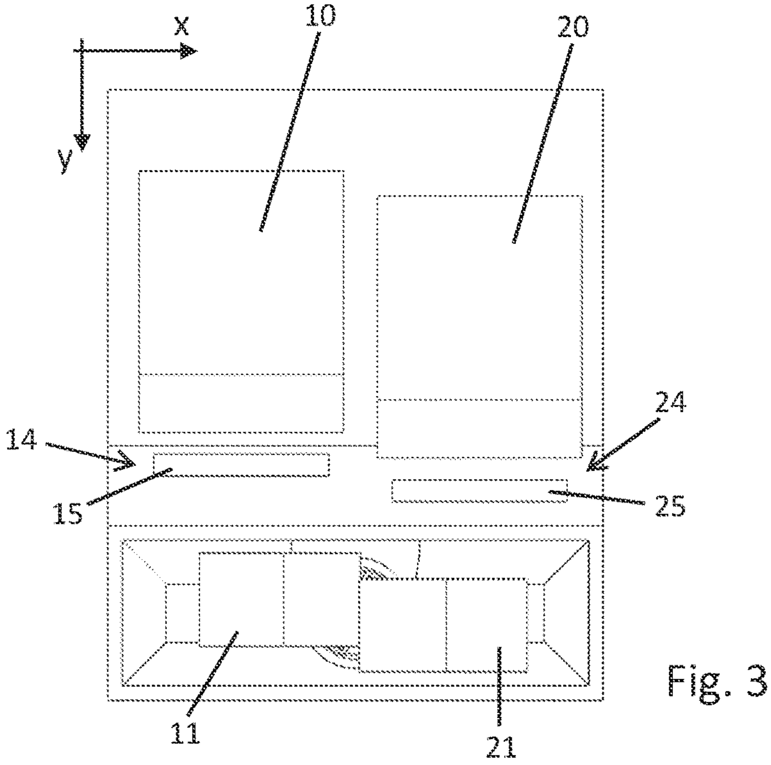
FIG. 3 shows a further schematic illustration of the device, viewed from above.
Figure 4:
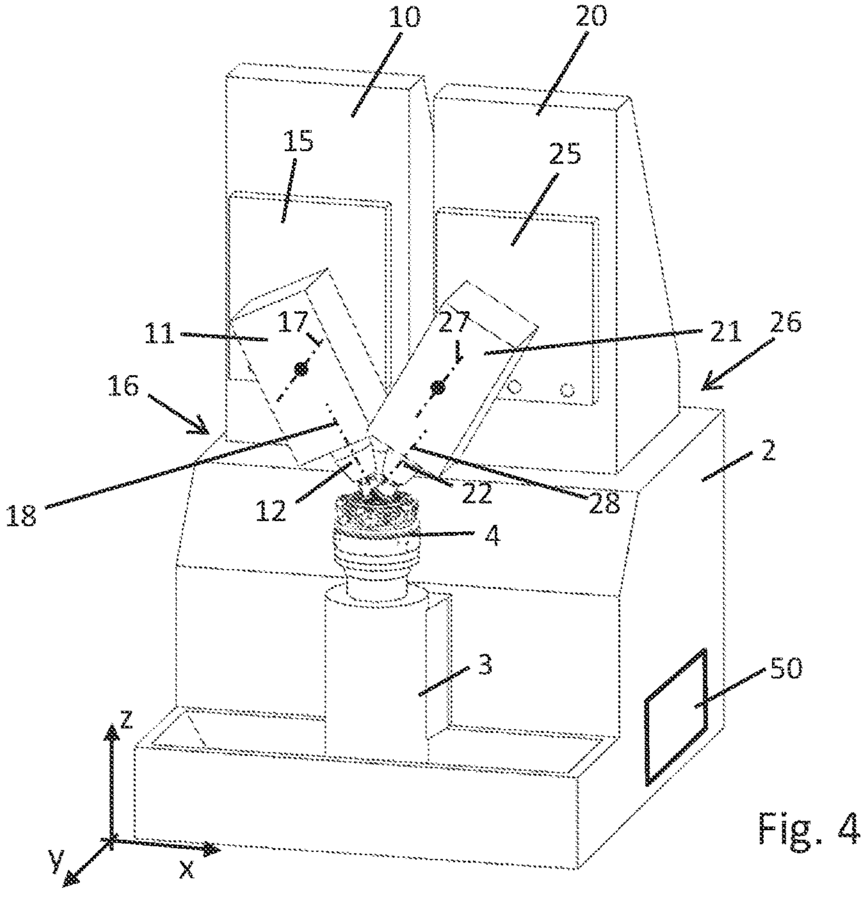
FIG. 4 shows a perspective illustration of the device from FIGS. 1 to 3.

As also illustrated in FIGS. 1, 2 and 4, the first machining head 11 is mounted on the first carrier 10 so as to be rotatable or pivotable with respect to a first pivot axis 17 and hence also relative to the base 2. Similarly, the second machining head 21 is mounted on the second carrier 20 so as to be rotatable or pivotable with respect to a second pivot axis 27 and hence also relative to the base 2. By means of the rotatable mounting with respect to the first and second pivot axes 17, 27, the respective first and second tool axes 18, 28 of the first and second machining heads 11, 21 can be changed variably as required.

This allows in particular free positionability or orientability of the first and second machining heads 11, 21 relative to one another, and also relative to the base 2. The first and second pivot axes 17, 27 are typically each coupled to a dedicated drive which is connected for signaling purposes to the controller 50.

FIG. 1 shows a first spindle drive 13 which is coupled torque-transmissively to the first tool spindle 12. Furthermore, the second machining head 21 has a second spindle drive 23 which is coupled torque-transmissively to the second tool spindle 22.

FIG. 1 furthermore shows as an example a first drive unit 19 of the first machining head 11, and a second drive unit 29 of the second machining head 21. The first and second drive units 19, 29 and the first and second spindle drives 13, 23 are connected signal-transmissively to the controller 50. The drive units 19, 29 represent all drives of the carrier 10, 20 and machining heads 11, 21 so as to place the latter in any required position or orientation and move them with the required speed during the machining processes.

The spindle drives 9, 13, 23 are also connected signal-transmissively to the controller 50. The controller 50 can thus individually regulate and control as required the rotation speeds of the workpiece spindle 4, the first tool spindle 12 and the second tool spindle 22.

The drive of the pivot axes 17, 27 (not shown here) allows motorized pivoting, controllable by the controller 50, of the machining heads 11, 21 relative to the respective pivot axes 17, 27.

By means of the device 1 shown in FIGS. 1 to 4, different or identical toothings can be machined or produced on one and the same workpiece 5 simultaneously but at least temporally overlapping.

Figure 5:
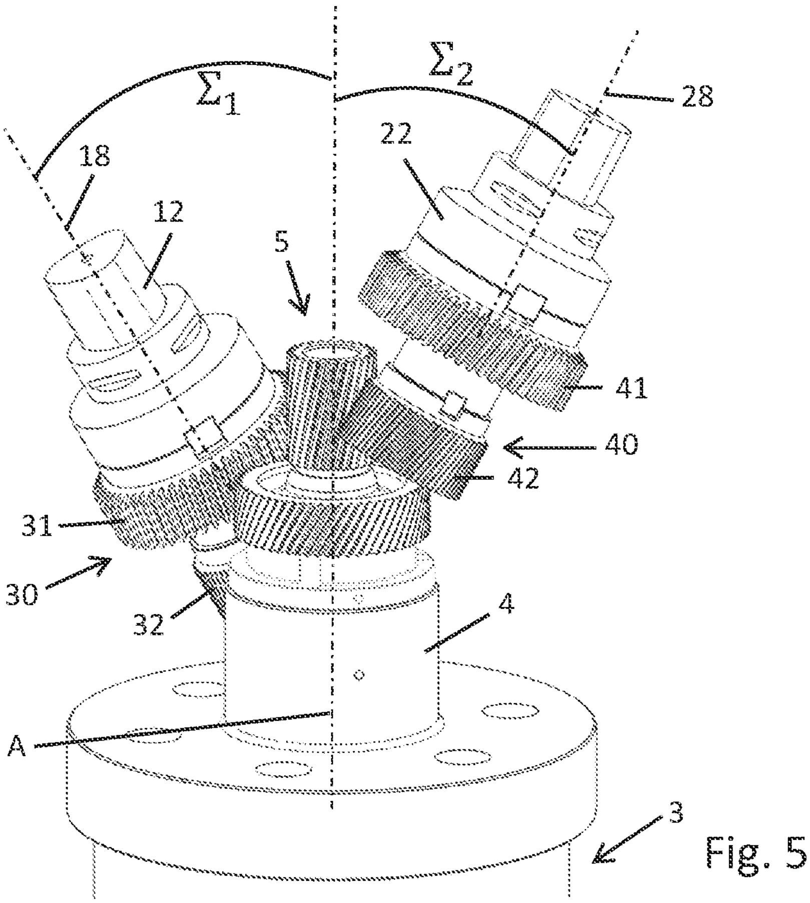
FIG. 5 shows a perspective illustration of an exemplary embodiment in which two machining tools are simultaneously in engagement with a workpiece.
Figure 6:
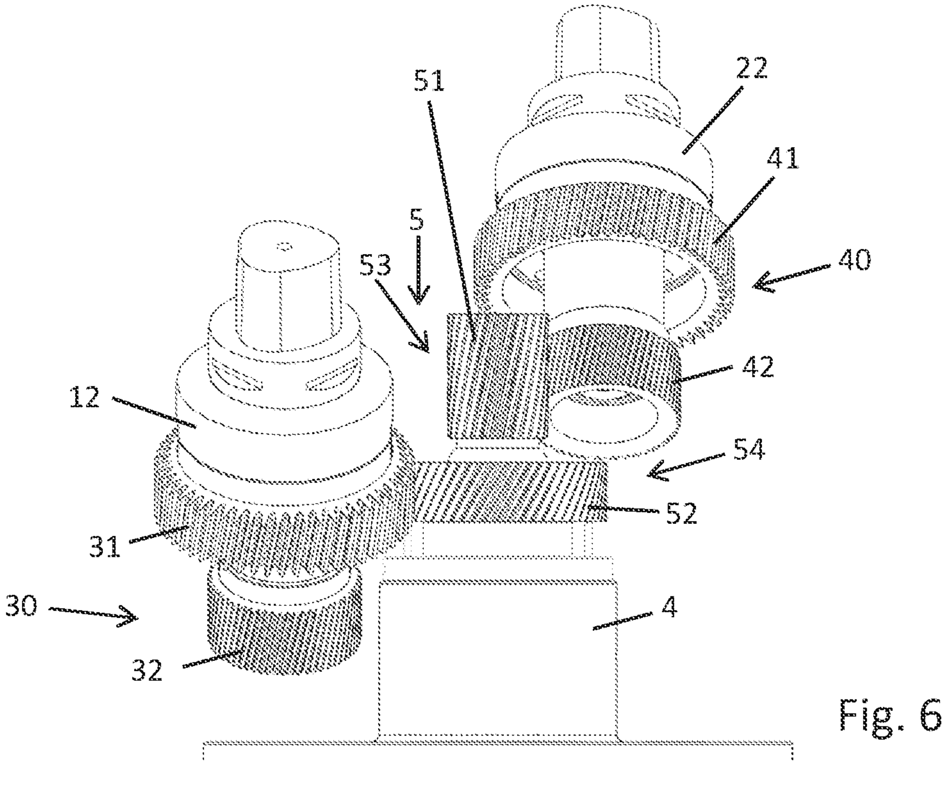
FIG. 6 shows an illustration of FIG. 5 viewed from the side.
Figure 7:
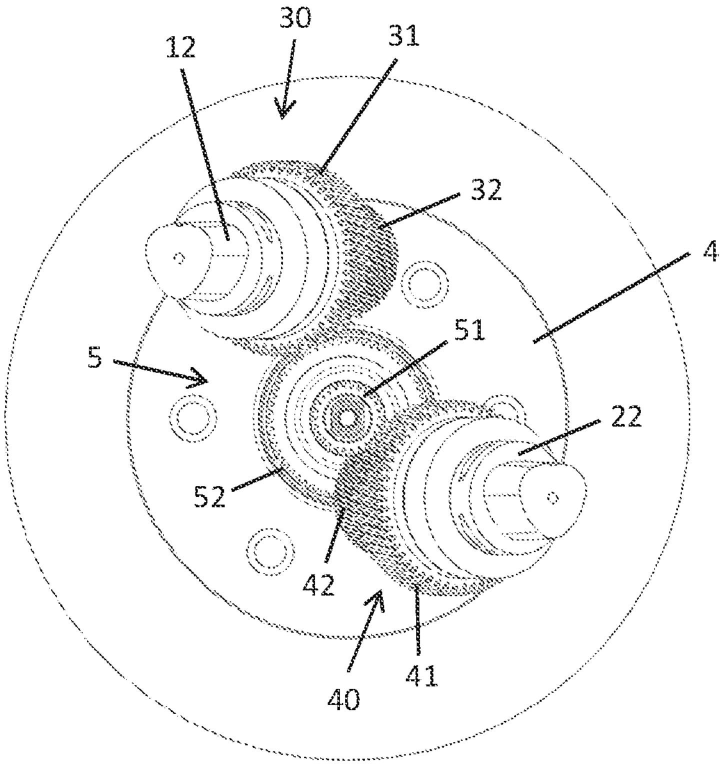
FIG. 7 shows a further illustration of FIG. 5 viewed from above.

FIGS. 5 to 7 show a mutual engagement of two machining tools 30, 40 with one and the same workpiece 5. The first machining tool 30 is clamped in the first tool spindle 12. The first machining tool 30 has a first tool toothing 31, and axially offset thereto a second tool toothing 32. The first and second tool toothings 31, 32 are typically different toothings. These may differ from one another with respect to tooth count, tooth geometry, tooth orientation and also their radius or axial extent. Similarly, the second machining tool 40, which is arranged on the second tool spindle 22, has a first tool toothing 41 and a second tool toothing 42. These toothings 41, 42 are also configured or arranged axially offset to one another on the machining tool 40.

The workpiece 5 to be machined has a first portion 53 and a second portion 54. In the region of the first portion 53 lies a first toothing 51 which is produced, created and/or machined by means of the second tool toothing 42 of the second machining tool 40. The second portion 54 of the workpiece 50 has a second toothing 52. This second toothing 52 is axially spaced from the first toothing 51 or axially adjoins the first toothing 51. This second toothing 52 is in engagement with the first tool toothing 31 of the first machining tool 30 and is produced and/or machined by said first machining tool 30.

It is clear from FIGS. 5 to 7 in particular that the two machining tools 30, 40 come to lie at a predefined radial distance from one another on approximately radially opposite or diametrically opposite sides of the workpiece 5, or stand in engagement with corresponding first and second portions 53, 54 of the workpiece 5 simultaneously or with a temporal overlap. The tool toothings 31, 42 which stand simultaneously in engagement with axially offset portions 54, 53 of the workpiece 5, typically each perform a power skiving process. The two machining tools 30, 40 are here guided by the respective machining heads 11, 21 under program control by the controller 50.

Since the two skiving processes take place simultaneously, the dynamic control parameters of the respective machining heads 11, 21 or their tool spindles 12, 22 are matched to one another according to the following correlation with the above-mentioned variables:

$$n_c = n_b*\left(\frac{z_b}{z_2}\right) + v_{z2}*\left(\frac{u_{dz2}}{z_2}\right) = n_a*\left(\frac{z_a}{z_1}\right) + v_{z1}*\left(\frac{u_{dz1}}{z_1}\right).$$

The controller 50, which is connected for signaling purposes to both the drive of the workpiece spindle 4 and to all drives of the machining heads 11, 21 and the associated tool spindles 12, 22, can implement a corresponding motion coupling of the two tool spindles 12, 22 or respective machining heads 11, 21.

The illustration of FIG. 5 furthermore shows the axis intersection angles $\Sigma_1$ or $\Sigma_2$. The axis intersection angle $\Sigma_1$ extends between the rotational axis of the workpiece spindle 4 and the first tool axis 18. The axis intersection angle $\Sigma_2$ extends between the rotational axis of the workpiece spindle 4 and the second tool axis 28, as indicated in FIG. 5.

Figure 8:
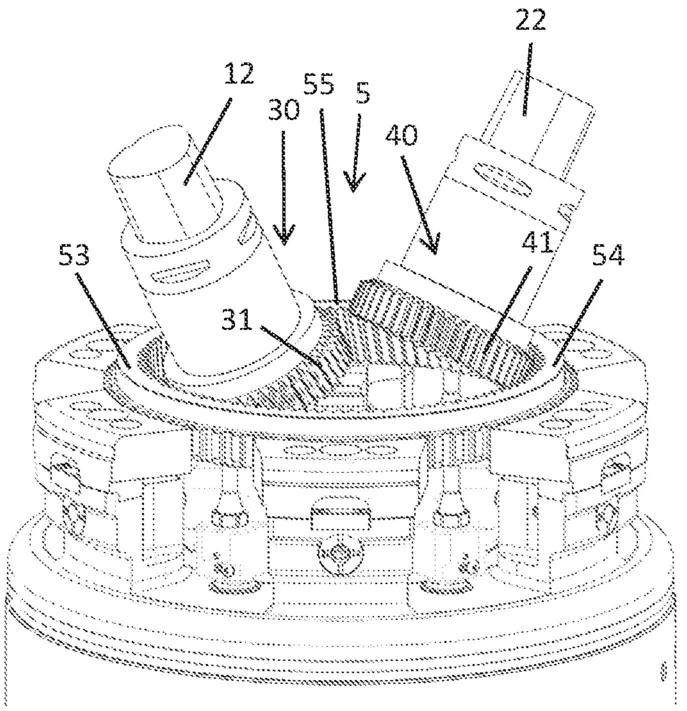
FIG. 8 shows an illustration of a further exemplary embodiment in which the first and second machining tools are simultaneously in engagement with an internal toothing of a workpiece.
Figure 9:
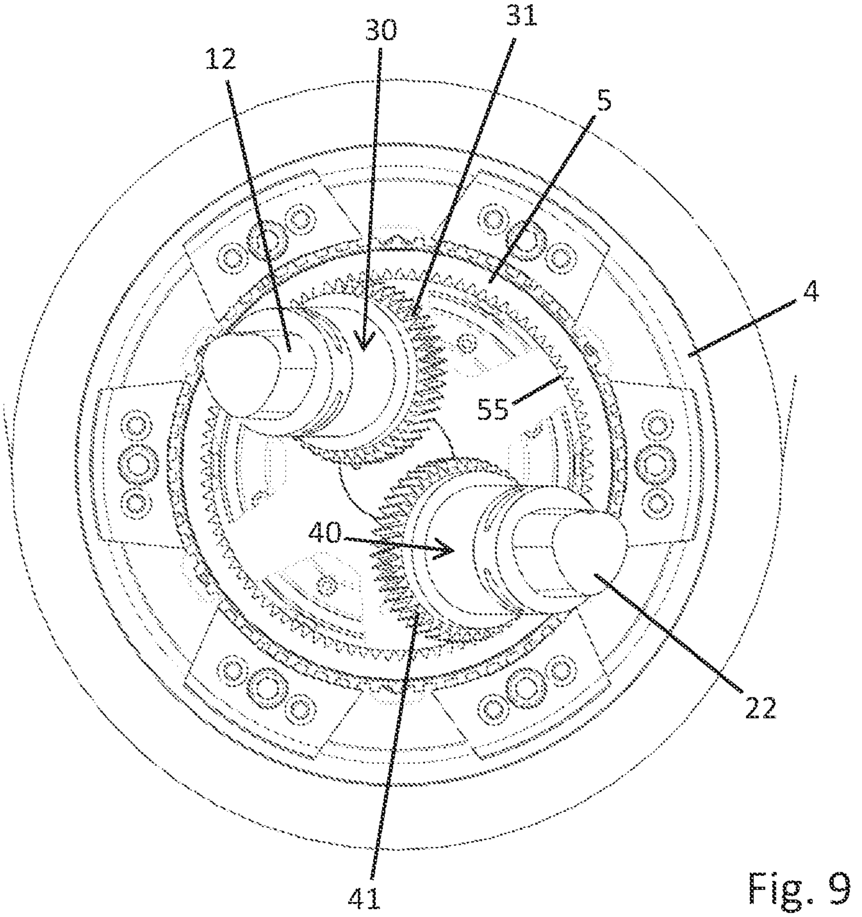
FIG. 9 shows a top view of the arrangement in FIG. 8, viewed from above.

FIGS. 8 to 9 show a further exemplary embodiment in which the two machining heads 11, 21 with the machining tools 30, 40 arranged thereon stand simultaneously in rolling or skiving engagement with an internal toothing of a workpiece 5. First and second portions 53, 54 of the workpiece 5 are here at a radial distance. They may in particular lie diametrically opposite one another, so that for example the first machining tool 30 with a first tool toothing 31 is in engagement with the first portion 53, and the second machining tool 40 with its first tool toothing 41 is in engagement with an also internal second portion 54 of the internal toothing 55 of the workpiece 5. Here, the two portions 53, 54 may be arranged opposite one another on the internal toothing 55.

The simultaneous engagement of two machining tools 30, 40 with one and the same toothing 55 can accelerate the entire machining or machining process for production of the internal toothing 55. This is also applicable similarly to external toothings.

Figure 10:
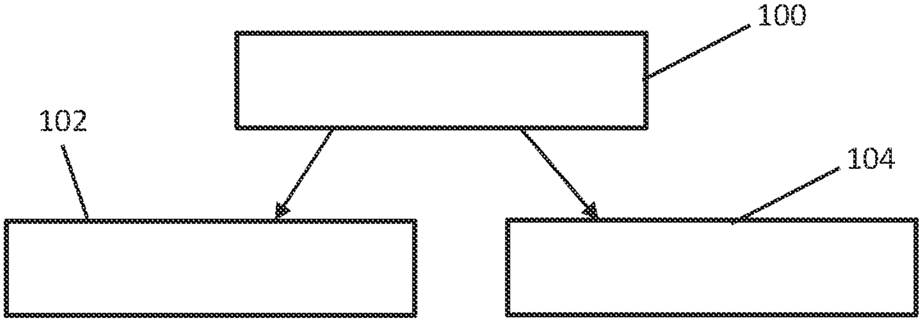
FIG. 10 shows a flow diagram of an exemplary embodiment of a method for simultaneous machining of a workpiece by means of a device described herein.

The flow diagram in FIG. 10 shows schematically the method for simultaneous power skiving of one and the same workpiece 5. In a first step 100, the workpiece 5 to be toothed is arranged on a workpiece spindle 4, mounted rotatably about a first axis (A), of an above described device 1. In the following step 102, power skiving of at least a first portion 53 of the workpiece 5 takes place by means of a first machining tool 30. The first machining tool 30 is arranged on the first tool spindle 12 of a first machining head 11.

The first machining head 11 or first tool spindle 12, and also the workpiece spindle 4, are driven under program control or controlled by the controller 50. Simultaneously, in a further step 104, a second portion 54 of the workpiece 5 is machined by means of the second machining tool 40. The second machining tool 40 is arranged on the second tool spindle 22 of a second machining head 21.

The second machining head 21 is here variably positioned and/or variably oriented relative to the first machining head 11 and independently of the first machining head 11, in order to machine the second portion 54 of the workpiece. Advantageously, in both steps 102, 104, a first skiving process and a second skiving process take place simultaneously or at least temporally overlapping.

What is claimed:

1. A device for machining a workpiece, the device comprising:

a base;

a workpiece spindle mounted rotatably about a first axis (A) for receiving the workpiece;

a first machining head with a first tool spindle mounted rotatably relative to a first tool axis for receiving a first machining tool;

a second machining head for receiving a second machining tool;

wherein at least the first machining head is provided with the first machining tool for power skiving the workpiece; and wherein the second machining head is variably positionable and/or variably orientable relative to the first machining head and independently of the first machining head;

a controller for controlling the first machining head and/or the second machining head such that the following correlation applies:

$$n_c = n_b*\left(\frac{z_b}{z_2}\right) + v_{z2}*\left(\frac{u_{dz2}}{z_2}\right) = n_a*\left(\frac{z_a}{z_1}\right) + v_{z1}*\left(\frac{u_{dz1}}{z_1}\right), \text{ where:}$$

$n_c$: rotation speed of workpiece axis $n_a$: rotation speed of $1st$ tool spindle $n_b$: rotation speed of $2nd$ tool spindle $z_a$: tooth count of $1st$ skiving tool $z_b$: tooth count of $2nd$ skiving tool $z_1$: tooth count of $1st$ toothing of workpiece $z_2$: tooth count of $2nd$ toothing of workpiece $v_{z1}$: advance speed of axial axis ($z$) of $1st$ tool spindle $v_{z2}$: advance speed of axial axis ($z$) of $2nd$ tool spindle $$u_{dzi} = \text{axial}-\text{differential}-\text{constant} = \sin\left(\frac{\beta_i}{m_{ni}*\pi}\right); \text{ where } i = 1, 2$$

wherein i=1 indicates the first skiving tool or first toothing of the workpiece, and i=2 the second skiving tool or second toothing of workpiece, and wherein:

$\beta_i$: slope angle of teeth of workpiece i $m_{ni}$: normal modulus of toothing i.

2. The device as claimed in claim 1, wherein the second machining head is freely positionable and/or freely orientable relative to the first machining head.

3. The device as claimed in claim 1, wherein the first machining head and the second machining head are arranged on the base so as to be displaceable relative to a first direction (x) independently of one another.

4. The device as claimed in claim 3, wherein the first machining head and the second machining head are arranged on the base so as to be displaceable relative to a second direction (y) independently of one another.

5. The device as claimed in claim 4, wherein the first machining head and the second machining head are arranged on the base so as to be displaceable relative to a third direction (z) independently of one another.

6. The device as claimed in claim 1, wherein the first machining head is mounted pivotably with respect to a first pivot axis running perpendicularly relative to the first tool axis.

7. The device as claimed in claim 1, wherein the second machining head is mounted pivotably with respect to a second pivot axis running perpendicularly relative to a second tool axis of a second tool spindle mounted rotatably relative to the second tool axis.

8. The device as claimed in claim 1, wherein the first machining head provided with the first machining tool is brought into engagement with a first portion of the workpiece, and wherein the second machining head is provided with the second machining tool and is brought into simultaneous engagement with a second portion of the workpiece, and wherein the first portion and the second portion of the workpiece are offset to one another axially and/or radially relative to the first axis (A).

9. The device as claimed in claim 1, wherein the second machining head has a second tool spindle mounted rotatably relative to a second tool axis for receiving the second machining tool.

10. The device as claimed in claim 9, wherein the second machining head is provided with the second machining tool for power skiving the workpiece.

11. The device as claimed in claim 10, wherein the first machining tool and the second machining tool are configured for simultaneous power skiving of the workpiece.

12. The device as claimed in claim 1, wherein the first machining head is provided with the first machining tool and/or the second machining head is provided with the second machining tool, and wherein the first machining tool and/or the second machining tool are configured for producing and/or machining a first toothing and/or a second toothing of the workpiece.

13. A method for machining a workpiece, comprising:

arranging a workpiece to be machined on a workpiece spindle mounted rotatably about a first axis (A) of a device for workpiece machining;

power skiving at least a first portion of the workpiece by means of a first machining tool, which is arranged on a first tool spindle of a first machining head;

simultaneous machining a second portion of the workpiece by means of a second machining tool, which is arranged on a second tool spindle of a second machining head that is variably positioned and/or variably oriented relative to the first machining head and independently of the first machining head;

wherein the first machining head, the first tool spindle, the second machining head, the second tool spindle and the workpiece spindle are actuated simultaneously by means of a controller such that the following correlation applies:

$$n_c = n_b * \left(\frac{z_b}{z_2}\right) + v_{z2} * \left(\frac{u_{dz2}}{z_2}\right) = n_a * \left(\frac{z_a}{z_1}\right) + v_{z1} * \left(\frac{u_{dz1}}{z_1}\right), \text{ where}$$

$n_c$: rotation speed of workpiece axis $n_a$: rotation speed of 1st tool spindle $n_b$: rotation speed of 2nd tool spindle $z_a$: tooth count of 1st skiving tool $z_b$: tooth count of 2nd skiving tool $z_1$: tooth count of 1st toothing of workpiece $z_2$: tooth count of 2nd toothing of workpiece $v_{z1}$: advance speed of axial axis ($z$) of 1st tool spindle $v_{z2}$: advance speed of axial axis ($z$) of 2nd tool spindle $$u_{dzi} = \text{axial} - \text{differential} - \text{constant} = \sin\left(\frac{\beta_i}{m_{ni} * \pi}\right); \text{ where } i = 1, 2$$

wherein i=1 indicates the first skiving tool or first toothing of the workpiece, and i=2 the second skiving tool or second toothing of workpiece, and wherein:

$\beta_i$: slope angle of teeth of workpiece i $m_{ni}$: normal modulus of toothing i.

* * * * *